Figure 1:
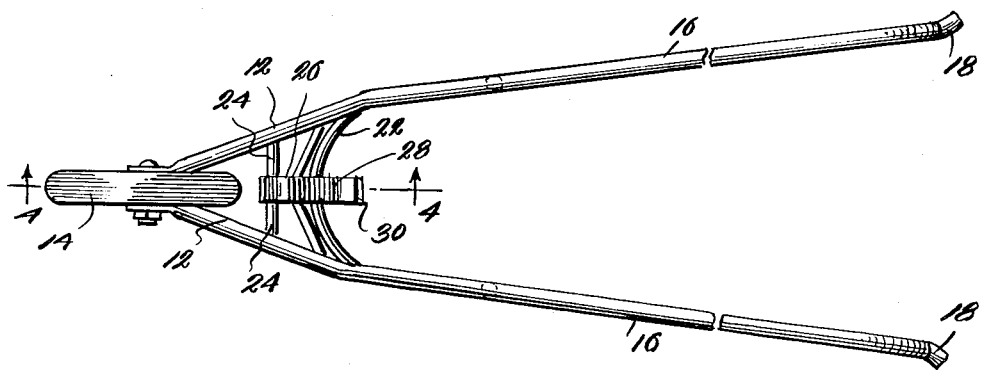

April 19, 1955   R. E. EASTERDAY   2,706,568
HAND TRUCK
Filed Aug. 15, 1952

INVENTOR.
RAYMOND E. EASTERDAY
BY *Patrick D. Beavers*
ATTORNEY

United States Patent Office 2,706,568
Patented Apr. 19, 1955

2,706,568

HAND TRUCK

Raymond E. Easterday, Blissfield, Ohio

Application August 15, 1952, Serial No. 304,545

1 Claim. (Cl. 214—384)

This invention relates to a hand truck and more particularly to a general utility hand truck having means especially designed for lifting and conveying conventional milk cans.

Another object is to facilitate the rapid engagement and lifting of the milk can by the simple maneuvering of the truck and lifting said cam to transport it, and the rapid disengagement of the truck from the can when the destination has been reached.

The above and other objects may be attained by employing this invention which embodies among its features a pair of elongated divergent side bars, a ground wheel mounted on the side bars adjacent the convergent ends thereof for rotation between said bars about a substantially horizontal axis, a saddle carried by the side bars and extending horizontally therebetween adjacent the wheel, a standard carried by the saddle and extending upwardly therefrom substantially midway between the side bars, and a hook carried by the standard and projecting outwardly therefrom toward the divergent ends of the side bars for engaging a handle carried by and extending upwardly and outwardly from an article resting against the saddle.

Other features include a tongue carried by the hook and adapted to engage the shoulder of a conventional milk can to hold it against the saddle.

Still other features include upwardly inclined handle bars carried by the side bars, and feet carried by the handle bars adjacent their junctions with the side bars.

Figure 2:
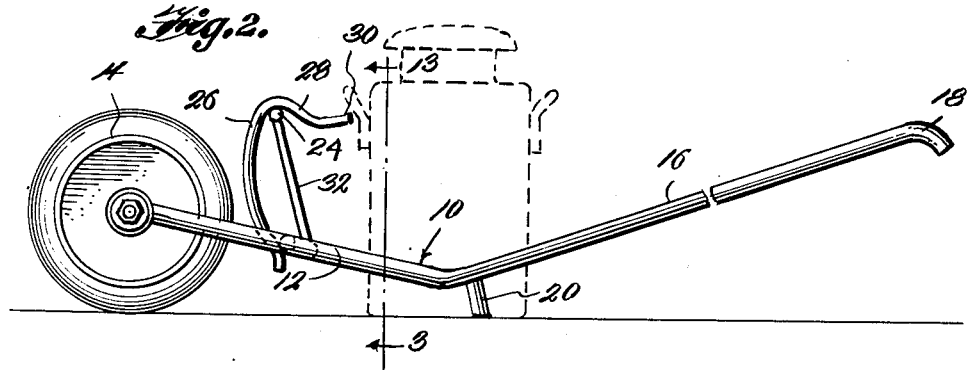
Figure 3:
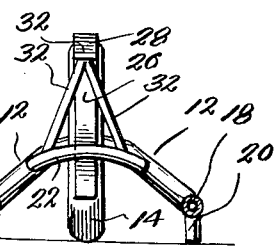
Figure 4:
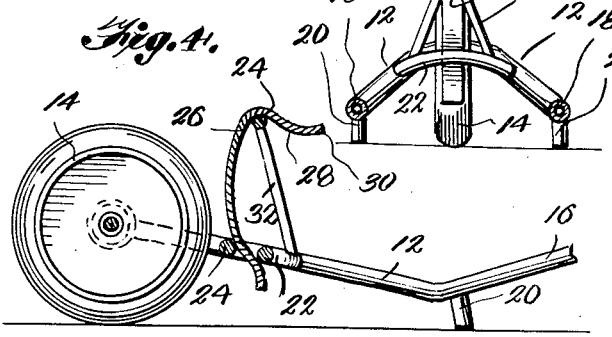

In the drawings:

Figure 1 is a plan view of a hand truck embodying the features of this invention, Figure 2 is a side view of the hand truck with a conventional milk can illustrated in broken lines between the side bars of the truck in a position to be picked up thereby, Figure 3 is a transverse sectional view taken substantially on the line 3—3 of Figure 2, and Figure 4 is a fragmentary longitudinal sectional view taken substantially on the line 4—4 of Figure 1.

Referring to the drawings in detail this improved hand truck designated generally 10 comprises a pair of spaced divergent side bars 12 between the convergent ends of which is mounted for rotation about a horizontal axis a ground wheel 14. Carried by the side bars 12 and extending longitudinally from the divergent ends thereof are upwardly inclined handle bars 16 carrying at their ends remote from the side bars 12 hand grips 18. Carried by and extending downwardly from the handle bars 16 adjacent their junction with the side bars 12 are feet 20 which as illustrated extend substantially perpendicularly to the handle bars 16 and form rests upon which the end of the truck remote from the wheel 14 is supported when it is at rest.

Carried by and extending transversely between the side bars 12 substantially midway between opposite ends thereof is a transversely curved bar having its convex side disposed toward the wheel 14 and forming a saddle 22 against which seats the side of a conventional milk can during the transportation of the latter. A brace bar 24 is carried by the side bars 12 between the saddle 22 and the wheel 14, and carried by the saddle 22 and the bar 24 substantially midway between the side bars 12 is an upwardly extending standard 26 carrying at its upper end a hook 28 which projects laterally from the standard 26 toward the divergent ends of the side bars 12. This hook 28 is provided at its end remote from the standard 26 with a tongue 30 which when the device is in use in conveying a conventional milk can overlies the shoulder forming the junction between the body and the neck of the can to securely hold the can on the hook and against the saddle 22 during the transportation of the can. Suitable divergent struts 32 are connected to the standard 26 adjacent the hook 28 and diverged downwardly and are rigidly secured to the side bars 12 adjacent the ends of the saddle member 22.

In use when it is desired to load a milk can on the truck, the truck is maneuvered into a position in which the milk can stands between the divergent ends of the side bars 12 and upon moving the truck toward the can, the tongue 30 and hook 28 may be engaged between the top of the handle on the milk can and the shoulder of the milk can to cause it to be held against the saddle 22 as the handle bars 16 are elevated by the grips 18. In this way the can can be lifted and transported to a selected position and simply by lowering the handle bars 16 the can may be deposited on a supporting surface and the truck moved away therefrom. Obviously the truck may be employed for transporting other types of load simply by placing the load on the side bars 12.

What is claimed is:

A hand truck for lifting and transporting an article having a handle loop projecting upwardly and outwardly therefrom, said hand truck comprising a pair of elongated downwardly and rearwardly extending divergent side bars, an upwardly and rearwardly extending handle formed integrally with each side bar, a ground wheel mounted on the side bars adjacent the convergent ends thereof for rotation therebetween, a cross bar interconnecting the side bars rearwardly of said wheel, a saddle interconnecting the side bars immediately rearwardly of said cross bar, a pair of upwardly convergent struts affixed at their lower ends to said saddle, a standard affixed to the upper ends of said struts and extending forwardly and downwardly between said saddle and said cross bar, a dependent leg affixed to the forward end of each handle, and a rearwardly extending tongue formed integrally with the upper end of said standard.

References Cited in the file of this patent

UNITED STATES PATENTS

| 1,608,371 | Carroll | Nov. 23, 1926 |
| 1,637,640 | Hendricks | Aug. 2, 1927 |
| 2,262,345 | Shepherd | Nov. 11, 1941 |
| 2,396,325 | Jiminez | Mar. 12, 1946 |
| 2,418,522 | Needham | Apr. 8, 1947 |

FOREIGN PATENTS

| 438,712 | Italy | Aug. 25, 1948 |